UNITED STATES PATENT OFFICE.

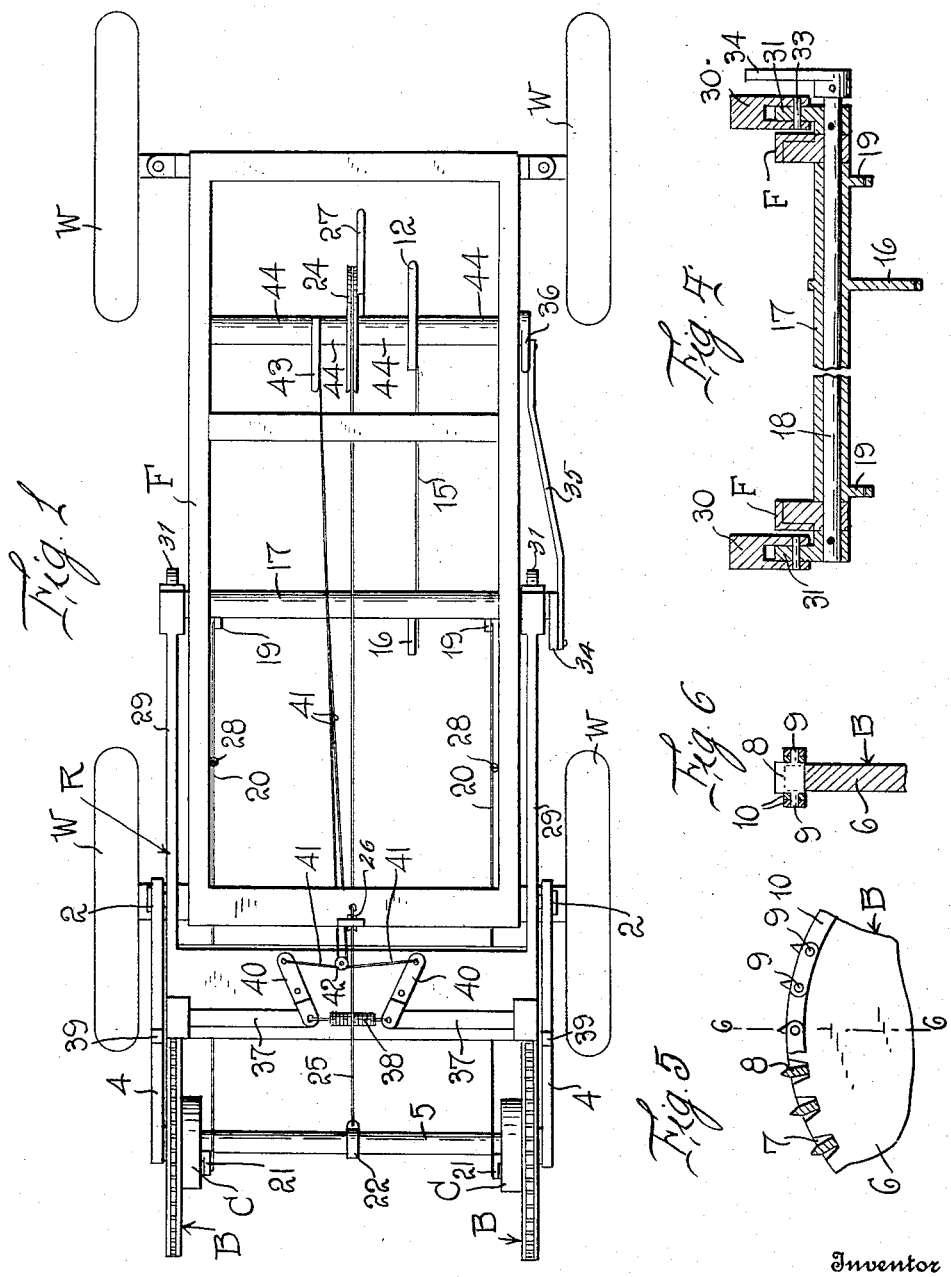

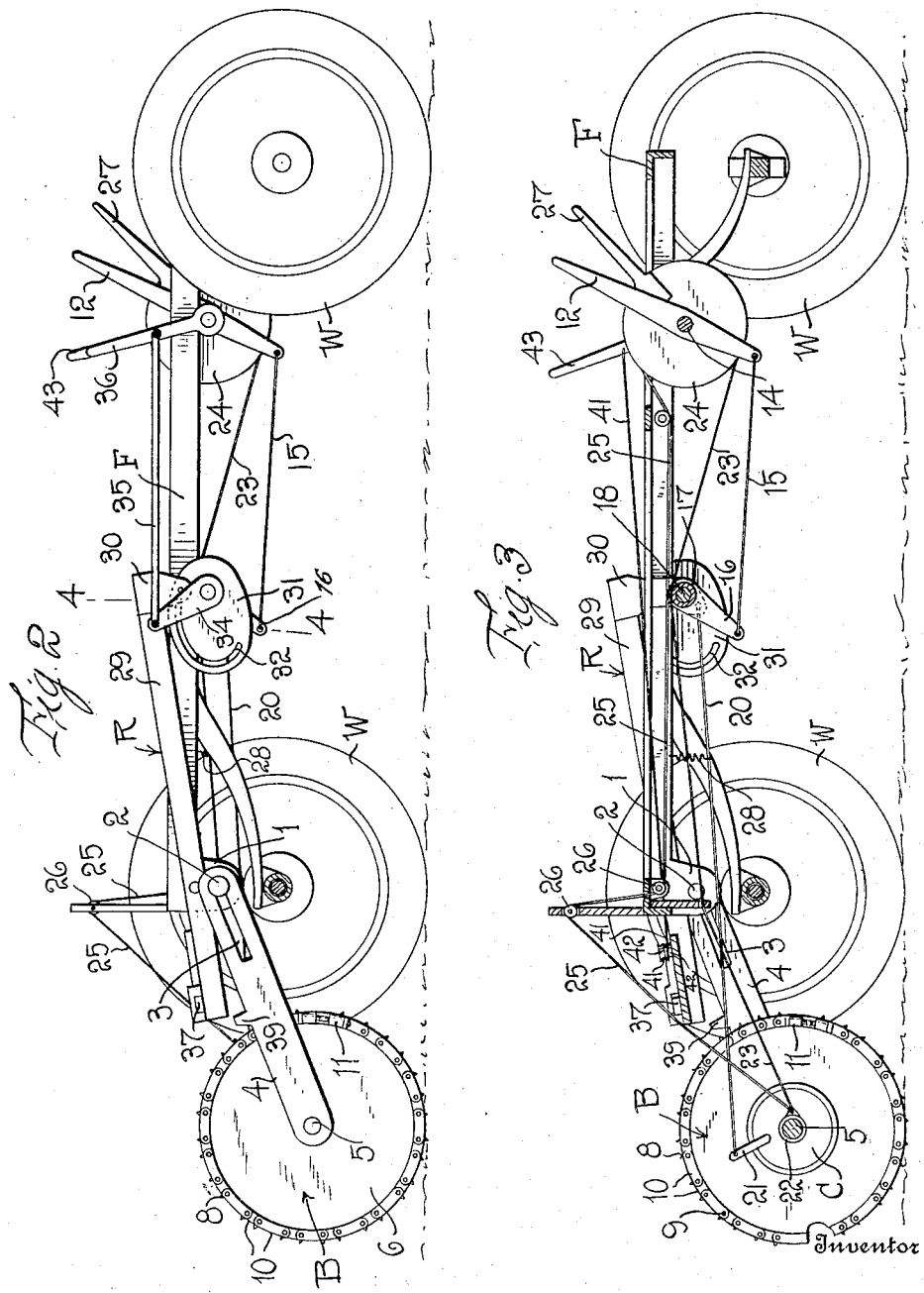

JOHN H. BREWER, OF LOUISVILLE, KENTUCKY.

VEHICLE-BRAKE.

1,219,073.     Specification of Letters Patent.     Patented Mar. 13, 1917.

Application filed December 2, 1916. Serial No. 134,746.

*To all whom it may concern:*

Be it known that I, JOHN H. BREWER, a citizen of the United States, residing at Louisville, in the county of Jefferson and State of Kentucky, have invented certain new and useful Improvements in Vehicle-Brakes, of which the following is a specification, reference being had to the accompanying drawings.

This invention relates to certain improvements in vehicle brakes and it is an object of the invention to provide a device of this general character having novel and improved means whereby an effective gripping action is had upon the surface over which the vehicle travels in order to retard or control the moving of the vehicle.

It is also an object of the invention to provide a novel and improved device of this general character including a rotatable member adapted to roll upon the surface over which the vehicle travels and whereby the same may be caused to frictionally engage said surface to effect a braking action.

Furthermore it is an object of the invention to provide a novel and improved device of this general character including a ground engaging member adjustably supported by a vehicle together with means whereby said ground engaging member may be adjusted into operative position.

The invention has for a still further object to provide a novel and improved device of this general character including a ground engaging member operatively supported by the vehicle together with means whereby the weight of the vehicle may be imposed upon said ground engaging member to facilitate the braking action thereof and which is particularly adapted for use in emergencies.

The invention consists in the details of construction and in the combination and arrangement of the several parts of my improved vehicle brake whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in top plan illustrating a brake constructed in accordance with an embodiment of my invention and in applied position, said figure being of somewhat a diagrammatic character;

Fig. 2 is a view in side elevation of the structure as disclosed in Fig. 1;

Fig. 3 is a longitudinal vertical sectional view taken through the device as herein disclosed;

Fig. 4 is a sectional view taken substantially on the line 4—4 of Fig. 2;

Fig. 5 is an enlarged fragmentary view partly in elevation and partly in section illustrating one of the ground engaging members as herein embodied; and Fig. 6 is a sectional view taken substantially on the line 6—6 of Fig. 5.

As disclosed in the accompanying drawings, F denotes a vehicle frame of any ordinary or preferred construction and supported in a conventional manner by the wheels W. The rear portion of the frame at the opposite sides thereof is provided with the depending arms 1 provided with the outstanding headed trunnions 2. The trunnions 2 are disposed through the longitudinally directed slots 3 produced in the rearwardly directed arms 4.

The outer ends of the arms 4 are connected by the stationary shaft 5 and upon which, adjacent the opposite ends thereof, are loosely mounted the braking members B. Each of the braking members B, as herein disclosed, comprises a disk 6 provided in its periphery with an annular series of recesses 7 in each of which is seated a calk 8.

As is particularly disclosed in Fig. 6, it is to be noted that the calk 8 is provided with the oppositely extending pins 9 with which are engaged the links 10. It will therefore be noted that the calks 8 are comprised in a chain-like or flexible structure which may be readily applied to or removed from the disk 6 and said calks 8 are effectively held upon the disk 6 through the medium of any suitable tensioning device, as indicated at 11, or by any other means which will operate with convenience and facility.

Each of the braking members B has coacting therewith a clutching device C preferably of a friction type and which is adapted to be operated through the medium of the lever 12 suitably positioned upon the frame F.

As herein embodied, the lever 12 is mounted intermediate its length for rocking movement upon the rod 14 disposed transversely of and supported by the frame F, and the lower end of said lever 12 is operatively engaged, as at 15, with the depending rock arm 16 carried by the sleeve 17 loosely mounted upon the shaft 18 rotatably supported by the frame F at a predetermined point rearwardly of the rod 14. The sleeve 17 is also provided adjacent its opposite ends with the depending arms 19 operatively engaged, as at 20, with the operating members 21 of the clutch members C, whereby it will be perceived that the braking members B may be conveniently controlled to retard the travel of the vehicle.

Intermediate its length the stationary shaft 5 is provided with a clip 22 with which is engaged an end of a flexible member 23 which is disposed forwardly of the frame F in connection with suitable guiding means and operatively engaged with the drum or pulley 24 mounted upon the rod 14. The flexible member is then returned, as at 25, to the clip 22, the returned portion 25 being disposed around the guides 26 in such a manner as to elevate the shaft 5 when a pull is imposed upon the returned portion 25. The drum 24 is provided with an operating member 27.

Normally the braking members B are in a position indicated in Figs. 1, 2 and 3 of the accompanying drawings and when it is desired to increase the action of said members upon the surface, the operating member 27 is pushed forwardly which results in the lifting of the shaft 5 and the slackening of the member 23. The member 27 is then pulled backward whereby the member 23 serves to return the members B in requisite engagement with the surface, and which engagement is materially facilitated by the endwise movement of the arms 4 as afforded by the slots 3 and which results in the braking members B being positioned in closer proximity to the rear end of the frame F.

It is to be understood that the disclosure in the accompanying drawings is of somewhat a diagrammatic character and for this reason a spring 28 is herein disclosed as coacting with each of the connections 20 for taking up the slack thereof during the last mentioned operation.

In the event of emergency I find that the action of the braking members B may be materially facilitated by throwing the weight of the vehicle upon the members B, and to accomplish this purpose I employ the rocking arm R provided at opposite sides with the forwardly directed arms 29 terminating at their front or free ends in the depending bifurcated heads 30 which straddle the marginal portions of the cam members 31.

Each of the cam members 31 is provided with a suitable cam slot 32 through which is directed the pin 33 carried by the adjacent head 30 and bridging the kerf afforded by its bifurcated portion. The cams 31 are affixed to the shaft 18 hereinbefore referred to and one end of said shaft is provided with the upstanding rock arm 34 operatively engaged through the medium of the rod 35 with the lever 36, whereby it will be perceived that the requisite movement may be imparted to the shaft 18 so as to either raise or lower the extensions 29 to impart the requisite rocking movement to the frame R.

The rear portion of the frame R is provided with the sliding bolts 37 normally maintained retracted through the medium of the retractile member 38 herein disclosed as a conventional coil spring operatively engaged with and interposed between the inner ends of the bolts 37. When the bolts 37 are extended they are adapted to pass above and contact with the upstanding lugs 39 carried by the arms 4, whereby it will be at once self-evident that the weight of the vehicle proper may be imposed upon the braking members B.

The inner ends of the bolts 37 have operatively engaged therewith the levers 40, said levers 40 being pivotally connected intermediate their lengths with the frame R and when the bolts 37 are retracted said levers 40 are disposed forwardly in diverging relation. The forward end portions of said levers 40 have secured thereto the flexible members 41 which are directed around the guide pulleys 42 carried by the frame R at a point intermediate said levers 40, and from said guide pulleys 42 the flexible members 41 are extended forwardly and operatively connected with the lever 43 suitably mounted upon the rod 14 hereinbefore referred to. It will be self-evident that upon forward movement being imparted to the lever 43 the bolts 37 will be extended so as to be in position to engage the lugs 39.

As herein disclosed, the levers 12 and 43 and drum 24 are maintained in requisite spaced relation through the medium of the spacing sleeves 44.

From the foregoing description, it is thought to be obvious that a vehicle brake constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a vehicle, arms pivotally engaged therewith and extending rearwardly thereof, means for swinging the arms in opposite directions, a stationary shaft connecting said arms, a ground engaging member loosely mounted on the shaft, and clutch means coacting with the shaft and ground engaging member for retarding the rotation of said member.

2. In combination with a vehicle, arms pivotally engaged therewith and extending rearwardly thereof, means for swinging the arms in opposite directions, a stationary shaft connecting said arms, a ground engaging member loosely mounted on the shaft, and clutch means coacting with the shaft and ground engaging member for retarding the rotation of said member, said arms being also capable of limited longitudinal movement.

3. In combination with a vehicle, arms pivotally engaged therewith and extending rearwardly thereof, a stationary shaft connecting said arms, a ground engaging member loosely mounted on the shaft, clutch member coacting with the shaft and ground engaging member for retarding the rotation of said member, and means for imposing pressure upon said arms.

4. In combination with a vehicle, arms pivotally engaged therewith and extending rearwardly thereof, a stationary shaft connecting said arms, a ground engaging member loosely mounted on the shaft, clutch means coacting with the shaft and ground engaging member for retarding the rotation of said member, a rock frame carried by the vehicle, and means for engaging said rock frame with the arms.

5. In combination with a vehicle, arms pivotally engaged therewith and extending rearwardly thereof, a stationary shaft connecting said arms, a ground engaging member loosely mounted on the shaft, clutch means coacting with the shaft and ground engaging member for retarding the rotation of said member, a rock frame carried by the vehicle, movable members carried by the rock frame, means for extending said members outwardly, and lugs carried by the arms with which said members are adapted to engage when in their outward position.

6. In combination with a vehicle, arms pivotally engaged therewith and extending rearwardly thereof, a stationary shaft connecting said arms, a ground engaging member loosely mounted on the shaft, clutch means coacting with the shaft and ground engaging member for retarding the rotation of said member, a rock frame carried by the vehicle, means for engaging said rock frame with the arms, and means for imparting rocking movement to said frame.

7. In combination with a vehicle, an arm pivotally engaged therewith and extending rearwardly thereof, a ground engaging member rotatably supported by the arm, means coacting with the engaging member for retarding the rotation thereof, a rock frame carried by the vehicle, and means for engaging said frame with the arm.

8. In combination with a vehicle, arms provided with elongated slots, means carried by the vehicle disposed through said slots whereby said arms are capable of rocking movement and of endwise movement, a rotatable ground engaging member supported by said arms and means for retarding the rotation of said member.

9. In combination with a vehicle, arms provided with elongated slots, means carried by the vehicle disposed through said slots whereby said arms are capable of rocking movement and of endwise movement, a rotatable ground engaging member supported by said arms, means for retarding rotation of said member, an operating member, and connections between the arms and the operating member for raising the arms upon movement of the operating member in one direction and for lowering the arms upon movement of the operating member in a second direction.

10. In combination with a vehicle, arms pivotally engaged therewith and extending rearwardly thereof, a stationary shaft connecting said arms, a ground engaging member loosely mounted on the shaft, clutch means coacting with the shaft and ground engaging member for retarding the rotation of said member, a rock frame carried by the vehicle, means for engaging said rock frame with the arms, a forwardly disposed extension carried by the rock frame, a cam element carried by the vehicle and coacting with the extension for imparting rocking movement to said rock frame, and means for imparting movement to the cam.

In testimony whereof I hereunto affix my signature in the presence of two witnesses.

JOHN H. BREWER.

Witnesses:
M. J. BREWER,
B. H. TODD.